United States Patent
Estelle et al.

(10) Patent No.: US 7,444,469 B2
(45) Date of Patent: *Oct. 28, 2008

(54) STORING INFORMATION REGARDING OPERATION OF AN AUTOMATED DATA STORAGE LIBRARY TO MEMORY AND TO A RESERVED CARTRIDGE

(75) Inventors: Daniel Charles Estelle, Tucson, AZ (US); Brian Gerard Goodman, Tucson, AZ (US); Diana Joyce Hellman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/960,500

(22) Filed: Dec. 19, 2007

(65) Prior Publication Data

US 2008/0098168 A1      Apr. 24, 2008

Related U.S. Application Data

(63) Continuation of application No. 11/270,770, filed on Nov. 9, 2005, now Pat. No. 7,386,667.

(51) Int. Cl.
G06F 12/00 (2006.01)
G11B 7/085 (2006.01)

(52) U.S. Cl. .................. 711/114; 711/112; 369/30.4; 369/30.38; 369/30.39

(58) Field of Classification Search .................. 711/112, 711/114; 369/30.4, 30.38, 30.39
See application file for complete search history.

(56) References Cited

U.S. PATENT DOCUMENTS

| | | | |
|---|---|---|---|
| 5,809,511 A | 9/1998 | Peake | 707/204 |
| 6,557,073 B1 | 4/2003 | Fujiwara et al. | 711/111 |
| 6,710,962 B1 | 3/2004 | Caverty et al. | 360/69 |
| 6,782,448 B2 | 8/2004 | Goodman et al. | 711/112 |
| 6,842,869 B2 | 1/2005 | Goodman | 714/43 |
| 6,851,031 B2 | 2/2005 | Trimmer et al. | 711/161 |
| 6,868,478 B2 | 3/2005 | Kishi et al. | 711/113 |
| 6,885,515 B2 | 4/2005 | Steinhilber | 360/69 |
| 6,898,480 B2 | 5/2005 | Goodman et al. | 700/213 |
| 2004/0240097 A1 | 12/2004 | Evans | 360/69 |
| 2005/0065648 A1 | 3/2005 | Sasaki | 700/245 |
| 2005/0080992 A1 | 4/2005 | Massey et al. | 711/114 |

FOREIGN PATENT DOCUMENTS

| | | |
|---|---|---|
| JP | 63237121 A | 10/1988 |
| JP | 9147535 | 6/1997 |
| WO | 9729484 A2 | 8/1997 |

*Primary Examiner*—Reginald G. Bragdon
*Assistant Examiner*—Mehdi Namazi
(74) *Attorney, Agent, or Firm*—John H. Holcombe

(57) ABSTRACT

A controller of an automated data storage library is configured to store information regarding operation of the library in a memory; to reserve at least one data storage cartridge; and to operate a data storage drive and the memory to transfer at least a portion of the information stored in the memory to the reserved data storage cartridge. The library controller is configured to maintain an externally available inventory of data storage cartridges of the library, e.g. for a host system, and excludes the reserved data storage cartridge from the inventory.

8 Claims, 4 Drawing Sheets ies) to transfer at least a portion of the information stored in the memory(ies) to the reserved data storage cartridge(s).

US 7,444,469 B2

STORING INFORMATION REGARDING OPERATION OF AN AUTOMATED DATA STORAGE LIBRARY TO MEMORY AND TO A RESERVED CARTRIDGE

CROSS REFERENCE TO RELATED APPLICATION

The present Application is a continuation of copending parent application Ser. No. 11/270,770, filed Nov. 09, 2005 now U.S. Pat. No. 7,386,667.

FIELD OF THE INVENTION

This invention relates to automated data storage libraries, and, more particularly, to the gathering of information regarding an automated data storage library.

BACKGROUND OF THE INVENTION

A trend for automated data storage libraries is the gathering of information regarding the library itself. Typically, an automated data storage library comprises a plurality of storage shelves for storing data storage cartridges; at least one robot accessor which transports the data storage cartridges; at least one data storage drive for reading and writing data with respect to the data storage cartridges; and a library controller which operates the robot accessor. Information gathering involves the collection, typically by the library, of information about the library, its components, the removable media drives, the data storage cartridges, and their use, which information may prove of use by the customer, library service personnel, the library manufacturer, etc. Examples of information that may be gathered may comprise drive information such as power on hours, amount of tape passed over the tape head of a magnetic tape drive since the last head or drive cleaning, total number of bytes read and/or written by a particular tape drive, number of permanent errors, a list of cartridge identifiers for cartridges that encountered certain errors, etc. Other examples may comprise cartridge information such as the number of full file passes for a data storage cartridge, number of times the cartridge has been mounted in a drive, the number of bytes read and/or written to the cartridge, a list of drives that encountered certain errors, etc. Still other examples may comprise library information such as the number of robot accessor mounts for certain drives, the number of pick/place operations, total distance traveled by the robot accessor, number of power on hours, etc.

SUMMARY OF THE INVENTION

Automated data storage libraries, data storage systems, and methods of providing a service of providing information regarding a data storage system are disclosed.

An automated data storage library comprises a plurality of storage shelves configured to store data storage cartridges; at least one robot accessor configured to transport the data storage cartridges; at least one data storage drive configured to read and write data with respect to data storage cartridges; at least one memory; and at least one library controller configured to operate the robot accessor(s) to transport the data storage cartridges. A data storage system comprises at least one host system and an automated data storage library.

The library controller, in one embodiment, is configured to store information regarding operation of the automated data storage library in the memory(ies), to reserve at least one data storage cartridge, and to operate the data storage drive(s) and the memory(ies) to transfer at least a portion of the information stored in the memory(ies) to the reserved data storage cartridge(s).

In another embodiment, the library controller additionally is configured to maintain an externally available inventory of data storage cartridges of the library, and excludes the reserved data storage cartridge(s) from the externally available inventory.

In a further embodiment, the library controller additionally is configured to indicate externally, such as to the host system, that the operated data storage drive is not being used.

In a further embodiment, the library controller is configured to, at predetermined intervals, operate the data storage drive(s) and the memory(ies) to transfer at least a portion of the information stored in the memory(ies) to the reserved data storage cartridge(s).

In another embodiment, the library controller is configured to respond to at least one predetermined event, to operate the data storage drive(s) and the memory(ies) to transfer at least a portion of the information stored in the memory(ies) to the reserved data storage cartridge(s).

In still another embodiment, the library controller additionally is configured to, at start up, operate the data storage drive(s) and the memory(ies) to transfer at least a portion of information stored in the reserved data storage cartridge(s) to the memory(ies) to initialize the memory(ies) for storing information regarding operation of the automated data storage library.

In another embodiment, the memory(ies) comprises a non-volatile memory, such that the memory may retain the information regarding operation of the automated data storage library, for a subsequent start up of the library.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
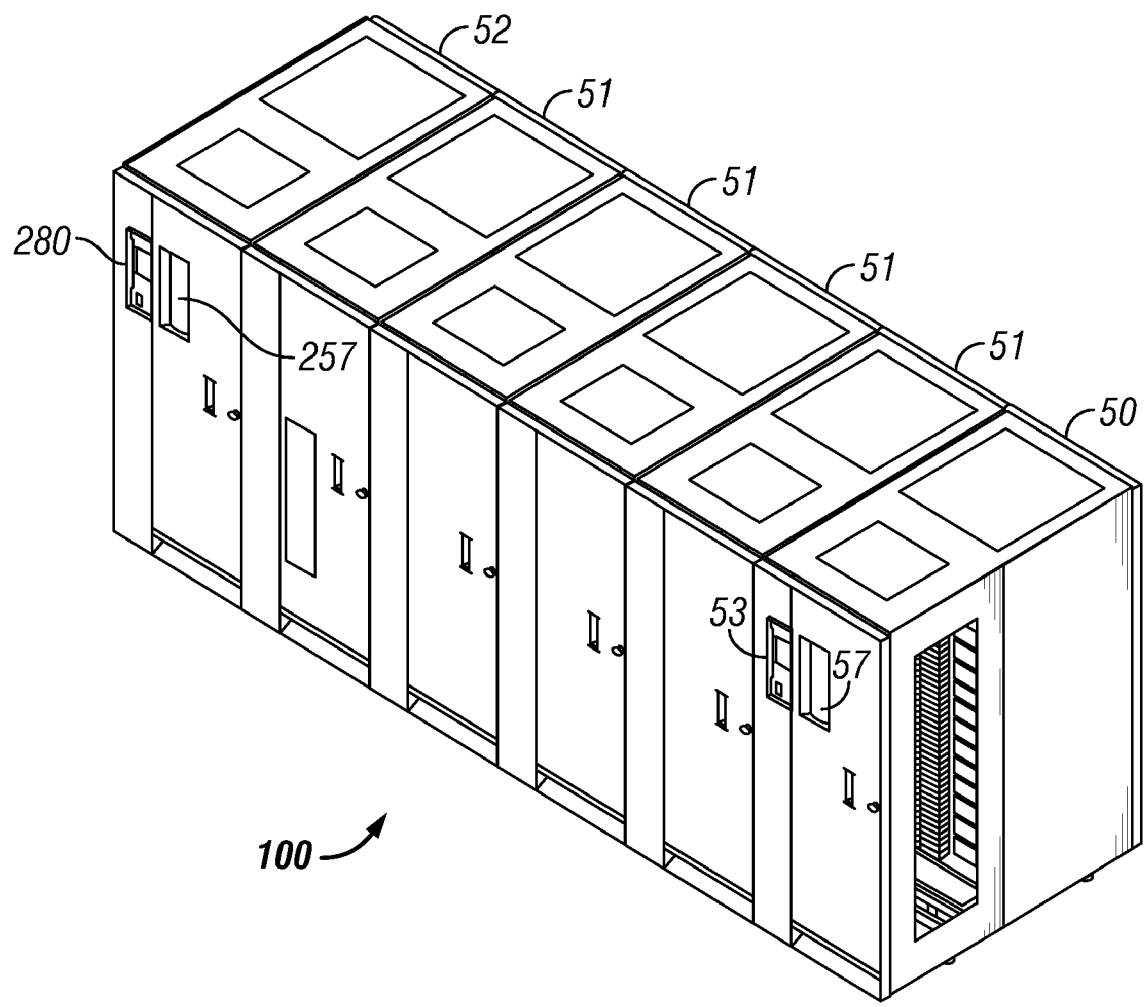
FIG. 1 is an isometric illustration of an automated data storage library which may implement the present invention.
Figure 2:
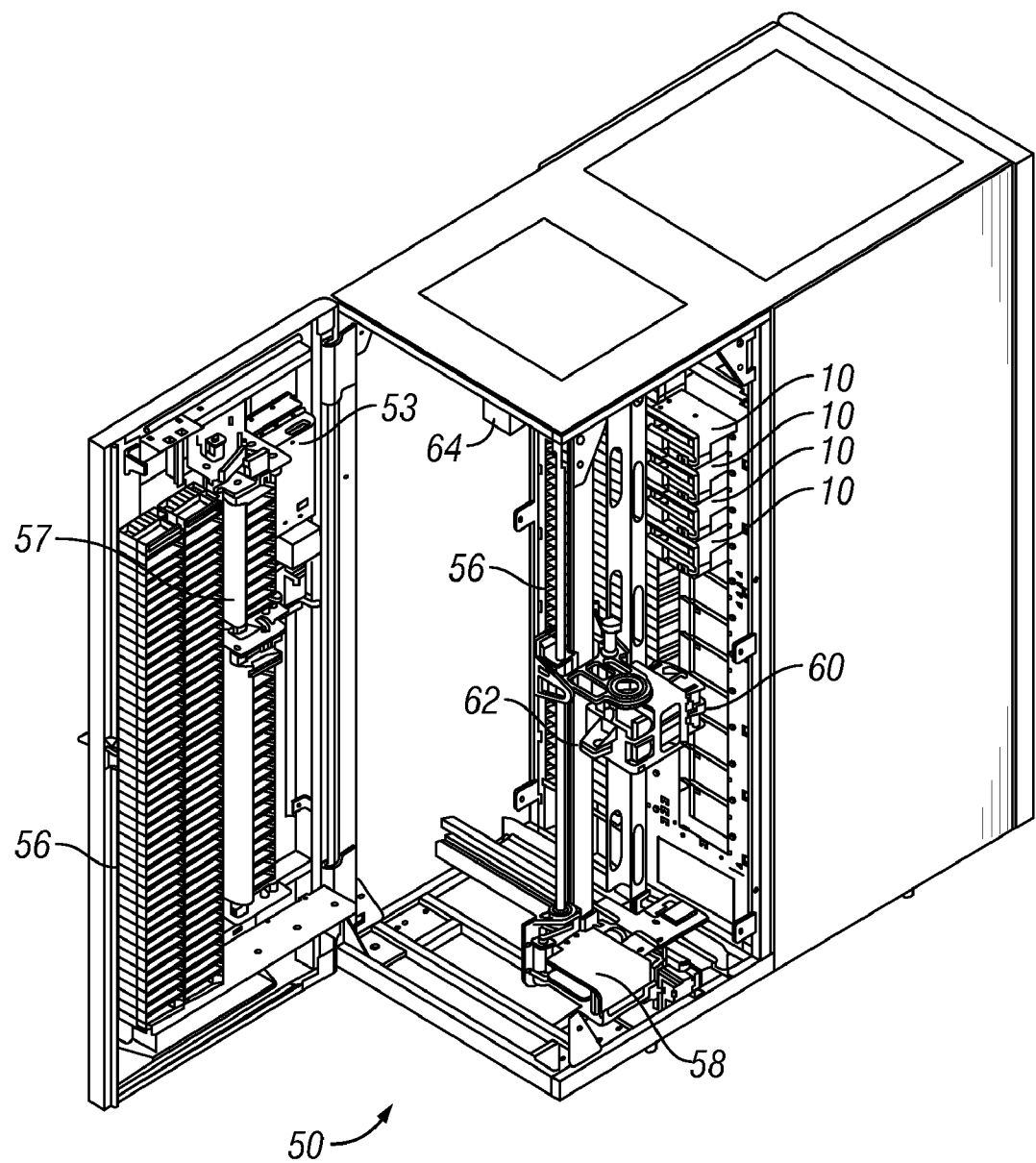
FIG. 2 is an illustration view of an opened frame of the automated data storage library of FIG. 1.
Figure 3:
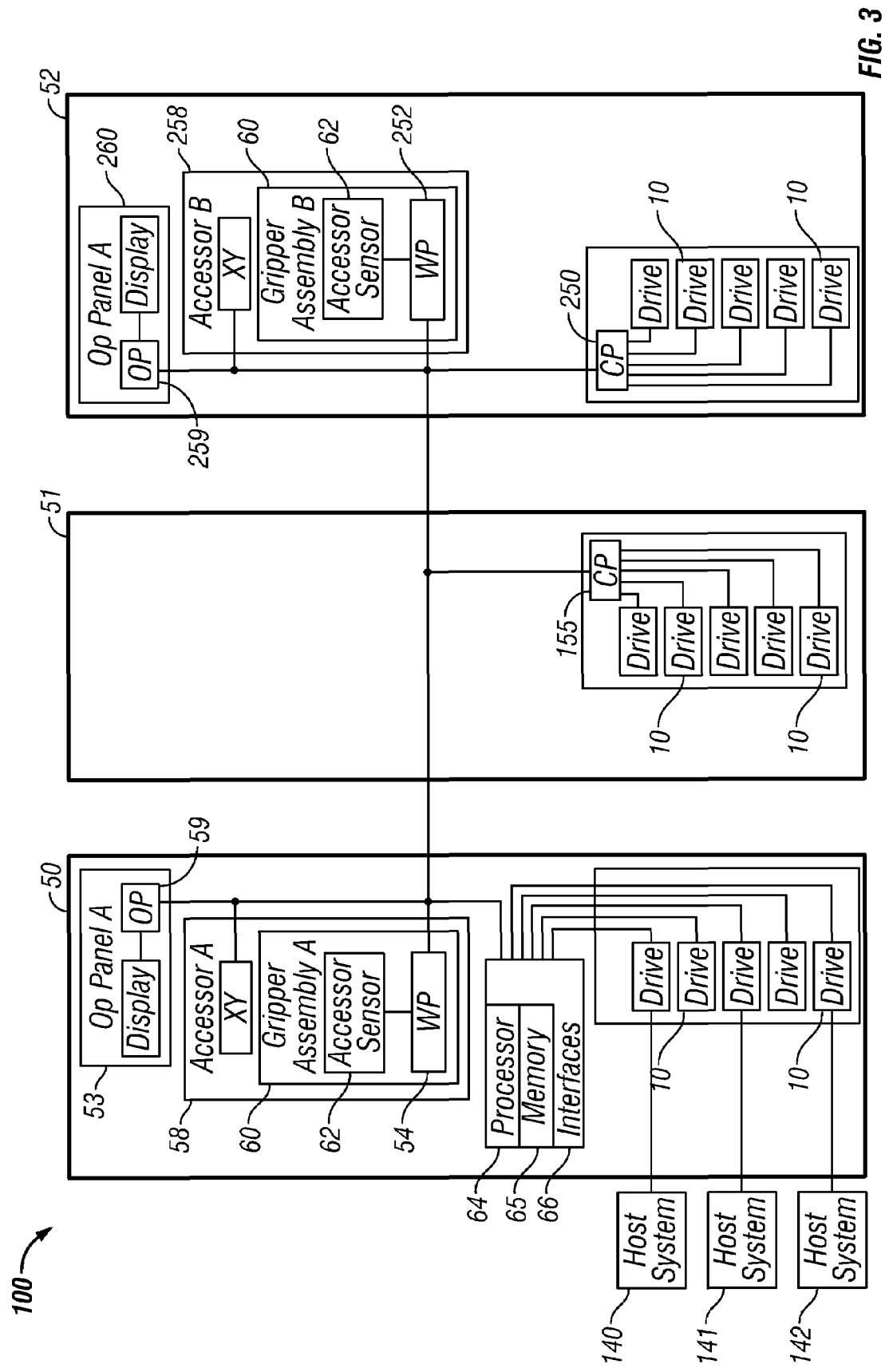
FIG. 3 is a block diagram of an embodiment of the automated data storage library of FIGS. 1 and 2.

FIGS. 1, 2 and 3 illustrate an embodiment of an automated data storage library 100, configured in accordance with the present invention, which is arranged to access data storage media, such as magnetic tape cartridges, typically in response to commands from at least one external host system, and comprises one or more frames 50, 51, 52, each of which may have a plurality of storage shelves 56 for storing the cartridges, and may have a plurality of magnetic tape data storage drives 10 for reading and/or writing data with respect to the magnetic tape cartridges. The library 100 further comprises at least one robot accessor 58, 258 for transporting the cartridges between the storage shelves 56 and the data storage drives 10. The robot accessor 58, 258 comprises a gripper assembly 60 for gripping one or more cartridges, and comprises an accessor sensor 62, such as an LED (Light Emitting Diode) emitter/detector, a bar code scanner, RFID reader, or other reading system to read the identifiers or labels of the cartridges or about the library.

The library 100 also comprises one or more library controllers 64 to operate the library, communicate with a host system 140 or host systems, communicate with the data storage drives 10, and may communicate with other processors of the library (if present). Alternatively, the data storage drives 10 may communicate with a host system or systems 141, 142, directly, and the library to host system or systems communication may be through the tape drive communication. Further, the library may provide one or more operator panels 53, 260, 280 for communicating with the library controller. The library controller may be set up as a centralized control system, or as a distributed control system. In the example of a distributed control system, additional processors 54, 59, 155, 250, 252, 259 may together with processor 64 comprise the library controller, and operate specific functions of the library. For example, processors 54 and 252, called "WP", may operate the robot accessors 58, 258 to transport the data storage cartridges, processors 59, 259, called "OP", may control the operator panels 53, 260, 280, and processors 64, 155, and 250, called "CP", may provide communications to data storage drives, host computers, remote computers, etc. An example of an automated data storage library comprises the IBM® 3584 tape library.

The library controller(s) typically comprises logic and/or one or more microprocessors with memory, such as memory 65 illustrated as provided for processor 64, for storing information and program information for operating the microprocessor(s). Herein "processor" may comprise any suitable logic, microprocessor, and associated memory for responding to program instructions, and the associated memory may comprise fixed or rewritable memory or data storage devices. The program information may be supplied to the library controller or memory from a host 140, 141, 142, or via a data storage drive 10, or by an input from a floppy or optical disk, or by being read from a cartridge, or by a web user interface or other network connection, or by any other suitable means. Processors 54, 59, 155, 250, 252, 259, may also be provided with memory of a lesser or greater capacity, and the memory may also be a non-volatile memory, a volatile memory, or may comprise both.

Data storage cartridges may be added to or removed from the library, for example, at input/output stations 57, 257. Typically, cartridges that have been unused for some period of time are removed from the library and may be archived. New, uninitialized cartridges are added to the library to store new data. The input/output stations 57, 257 typically provide a signal to identify that a cartridge or cartridges are input into the library, or that an input/output station door has been opened and/or closed.

An inventory is typically maintained by either the library, e.g. at one or more of the processors, or for the library by a host. Herein, the processor(s) of the library or of the host that maintains the inventory is called a "library controller", such as library controller 64. The inventory is of data storage cartridges, identifying active cartridges and a scratch pool, and their current location within the library, for example, the storage shelf storing the cartridge, or, if the cartridge is in a drive, identifying that drive.

As is understood by those of skill in the art, a magnetic tape data storage cartridge comprises a length of magnetic tape wound on one or two reels, an example of which is those adhering to the Linear Tape Open (LTO) format. One example of a magnetic tape data storage drive 10 is the IBM® 3580 Ultrium magnetic tape drive based on LTO technology. A further example of a single reel magnetic tape data storage drive and associated cartridge is the IBM® 3592 TotalStorage Enterprise magnetic tape drive and associated magnetic tape cartridge. An example of a dual reel cartridge is the IBM® 3570 magnetic tape cartridge and associated drive.

The library controller 64 (and other processors) are provided with interfaces 66 configured to communicate with the host system 140, 141, 142, or host systems, communicate with the data storage drives 10, and communicate with other processors of the library. The interfaces 66 may comprise serial interfaces such as RS-232 (Recommended Standard), USB (Universal Serial Bus), SAS (Serial Attached SCSI), IEEE 1394 (Institute of Electrical and Electronics Engineers), Fibre Channel, or any other serial interface as is known to those of skill in the art. Alternatively, interfaces 66 may comprise optical interfaces such as Fibre Channel, ESCON (Enterprise Systems CONnection), or any other optical interface as is known to those of skill in the art. In addition, interfaces 66 may comprise wireless interfaces such as IEEE 802.11, or any other wireless interface as is known to those of skill in the art. Still further, interfaces 66 may comprise parallel interfaces such as SCSI (Small Computer Systems Interface), or any other parallel interface as is known to those of skill in the art.

Figure 4:
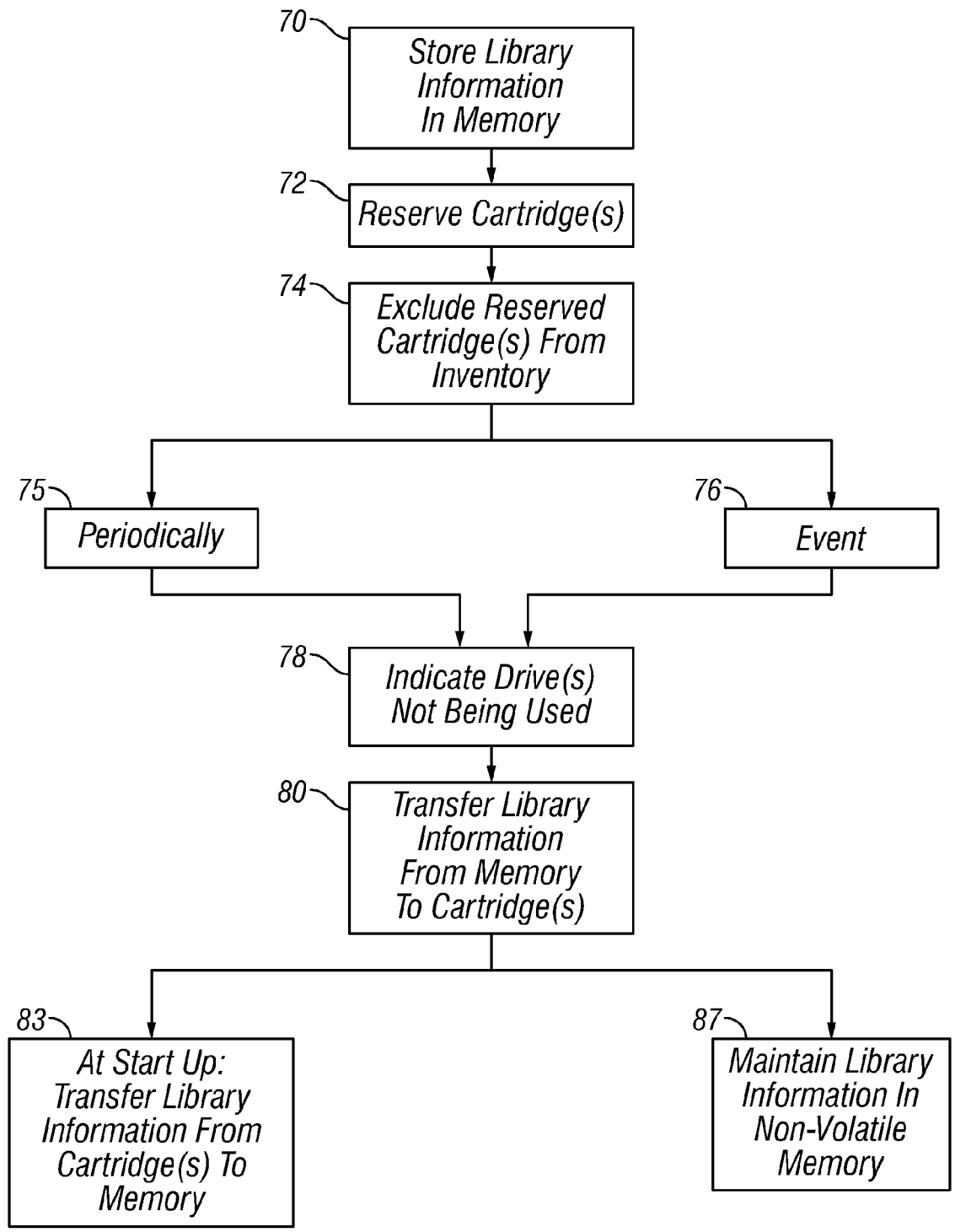
FIG. 4 is a flow chart depicting embodiments of methods in accordance with the present invention.

Referring additionally to FIG. 4, the library controller, e.g. controller 64, in accordance with the present invention, additionally is configured to, in step 70, store information regarding operation of the automated data storage library in the memory(ies) 65. As discussed above, the library controller gathers information regarding the library itself. Information gathering involves the collection of information about the library, its components, the data storage cartridges, and their use, which information may prove of use by the customer, library service personnel, the library manufacturer, etc. Examples of information that may be gathered may comprise drive information such as power on hours, amount of tape passed over the tape head of a magnetic tape drive since the last head or drive cleaning, total number of bytes read and/or written, number of permanent errors, a list of cartridge identifiers for cartridges that encountered certain errors, etc. Other examples may comprise cartridge information such as the number of full file passes for a magnetic tape cartridge, number of times the cartridge has been mounted in a drive, the number of bytes read and/or written to the cartridge, a list of drives that encountered certain errors with a given cartridge, etc. Still other examples may comprise library information such as the number of robot accessor mounts for certain drives, the number of pick/place operations, total distance traveled by the robot accessor, number of power on hours, etc.

This information is stored in memory 65 and may be called a "working copy". The content of the working copy changes as the information is gathered.

In step 72, the library controller reserves at least one data storage cartridge. Step 72 may precede step 70, or may succeed step 70. The reserved data storage cartridge may comprise one of the cartridges made available from the scratch pool, or may comprise a cartridge having a special label to designate it as potentially having library information, and may or may not have a special designation in the cartridge memory. As is known to those of skill in the art, data storage cartridges may additionally have a small capacity memory positioned in the cartridge with which the drive can communicate, the cartridge memory having a small amount of information about the cartridge.

As discussed above, the library controller additionally is configured to maintain an externally available inventory of data storage cartridges of the library. This is so that the host systems may identify the cartridge which they wish to access. The inventory may comprise a physical inventory indicating the presence of cartridges and their logical locations (e.g. SCSI element addresses), or it may comprise a "virtual inventory" indicating to the host a "virtual tape", and any one magnetic tape cartridge may actually comprise a plurality of virtual tapes. The host systems will issue a command to the library to access a desired magnetic tape cartridge or virtual tape, and the library will have the same or a separate inventory designating the physical storage shelf having the cartridge or the cartridge containing the virtual tape.

In accordance with the present invention, in step 74, the library controller excludes the reserved data storage cartridge(s) from the externally available inventory of cartridges having data, thereby hiding the cartridge from the host system so that normal data to be stored is not stored to the reserved cartridge. The library may maintain a separate location index of the reserved cartridge(s), for example, similar to, or combined with, a location index for cleaning cartridges. Alternatively, with respect to step 74, the reserved cartridge(s) may not be hidden from the host system, but may instead be inaccessible to the host system. For example, the SCSI (Small Computer Systems Interface) Read Element Status command provides a means for indicating that a particular cartridge is inaccessible. Herein, excluding a cartridge from the external inventory may comprise hiding the presence of the cartridge or it may comprise an indication that the cartridge is not accessible.

Steps 75 and 76 comprise alternatives, step 75 comprising a predetermined interval, and step 76 comprising a response to at least one predetermined event. An example of a predetermined interval is once every 4 hours. An example of a predetermined event is an impending library shutdown. Another example is the occurrence of certain changes to the working copy, such as changes to the cartridges in the library, removing some cartridges and adding others to the library. In yet another example of a predetermined event, the memory may become full, or partially full, such that the data needs to be moved to the reserved cartridge.

The library controller is further configured to have the robot accessor 58, 258 provide the reserved cartridge to a data storage drive 10 from its storage location, and is configured to, in step 78, indicate externally, such as to the host system, that the operated data storage drive is not being used. The library controller may queue or hold off any host commands that require the data storage drive 10 such that the host computer is unaware that the drive is being used to access the reserved cartridge. In this case, the library may instruct the drive to indicate that it is empty (has no cartridge present) through the host interface, such that a host computer would not unexpectedly see the reserved cartridge in the drive and attempt to access that reserved cartridge. Alternatively, the library controller can indicate that the data storage drive is unavailable, e.g. it is "busy". Still further, step 78 may be eliminated because host applications may not attempt to use a drive until they have received successful completion of a move medium command to the drive. In this case, a move medium command will not complete until the library has finished using the drive to read and/or write information to the reserved cartridge, as discussed in step 80.

The library controller, in step 80, operates the data storage drive(s) 10 and the memory(ies) 65 to transfer at least a portion of the information stored in the memory(ies) to the reserved data storage cartridge(s). In one alternative, the information is copied to the data storage cartridge from the memory. For example, the working copy may comprise an exact copy of the information, or a portion of the information, from the cartridge, that has been updated, and the working copy is written to the reserved cartridge. In another alternative, the information, or a portion of the information, is maintained in the memory, preferably non-volatile memory, and is merged with, combined with, or added to the information already existing in the cartridge. In this case, the working copy may comprise all or a subset of the information on the cartridge, and, when written, the two sets of information may need to be merged or combined. The content of the reserved cartridge may thus be modified as the information is updated or changes.

Storing the library information in the reserved cartridge ensures that the information is securely stored in a non-volatile form. The library stores the information to the reserved cartridge, and reads the information from the reserved cartridge, using an interface between the library controller and the data storage drive. This may comprise a library/drive interface such as interface 66, or this may comprise an interface between the library controller and the host interface of the drive (not shown). In any case, the interface used may comprise any interface as described above with reference to interface 66.

At some point in time, part or all of the library information may be needed. A customer or another person may request the information through a library interface 66, through a remote computer, through a remote management interface, etc.

Alternatively, the library may automatically send part or all of the information through a library interface, such as SNMP (Simple Network Management Interface) or Call-Home. Call-Home is a process where the library initiates a connection to a remote computer to send error information, library health information, status, etc. Still further, a remote computer, system or device may request part or all of the information through a library interface.

If the requested information resides in the working copy, then the library may use the working copy to satisfy the request. Alternatively, or if part or all of the requested information does not reside in the working copy, then the library may load the reserved cartridge into a drive to satisfy the information request. Still further, the library may use a combination of information from the working copy and information from the reserved cartridge to satisfy the information request.

At any point in time, the reserved data storage cartridge may be removed from the library to transfer the information to another system, to replace the cartridge due to errors or end-of-life issues, or for archiving purposes. Another data storage cartridge may be reserved for storing the library information. Further, there may be multiple reserved cartridges on hand for availability or redundancy concerns.

In step 83, the library controller 64, at start up, such as a power-on of the library, operates the data storage drive(s) 10 and the memory(ies) 65 to transfer at least a portion of information stored in the reserved data storage cartridge(s) to the memory(ies) to initialize the memory(ies) for storing information regarding operation of the automated data storage library. For example, if the portion of the memory(ies) 65 storing the working copy is volatile, the working copy will have to be initialized or seeded with the immediately preceding library information, which information is stored in nonvolatile form by the reserved cartridge.

Alternatively, the memory(ies) 65 may comprise non-volatile memory, such that the memory may, in step 87, retain the information regarding operation of the automated data storage library, for a subsequent start up of the library. Still further, step 83 may be eliminated. For example, the library may implement a method of combining or merging any new data gathered by the library, with previous data stored on the reserved cartridge. In this case, data from the reserved cartridge would not have to be transferred to the memory(ies) 65 until it is actually needed to fulfill a request for data stored on the reserved cartridge, as discussed above.

Those of skill in the art will understand that changes may be made with respect to the ordering of the steps of FIG. 4. Further, those of skill in the art will understand that differing specific component arrangements may be employed than those illustrated herein.

While the invention has been described with respect to an automated data storage library comprising magnetic tape cartridges, other removable media cartridges and drives may be used. For example, other magnetic media such as hard disks, floppy disks, or any other type of magnetic media as is known to those of skill in the art. In another example, the removable media may comprise optical media such as CD (Compact Disk), DVD (Digital Versatile Disk), MO (Magneto Optical), optical tape, or any other optical media as is known to those of skill in the art. Still further, the removable media may comprise electronic media such as CF (CompactFlash), SD (Secure Digital), xD (xD-Picture), Memory Stick, MMC (MultiMedia Card), PROM (Programmable Read Only Memory), ROM (Read Only Memory), flash PROM, battery backed up RAM (Random Access Memory), MEMS (Micro-Electro-Mechanical Systems) based storage, MRAM (Magnetoresistive Random Access Memory) or any other electronic media as is known to those of skill in the art.

While the invention has been described with respect to an automated data storage library comprising a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library or it may comprise one or more processor nodes of a distributed control system. Herein, library controller may comprise a single processor or controller or it may comprise multiple processors or controllers.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An automated data storage library comprising:
   a plurality of storage shelves configured to store data storage cartridges;
   at least one robot accessor configured to transport said data storage cartridges;
   at least one data storage drive configured to read and write data with respect to data storage cartridges;
   at least one memory; and
   at least one library controller configured to operate said at least one robot accessor to transport said data storage cartridges; configured to store information regarding operation of said automated data storage library in said at least one memory; and
   configured to reserve at least one data storage cartridge, and to operate said at least one data storage drive and said at least one memory to transfer at least a portion of said information stored in said at least one memory to said reserved at least one data storage cartridge; and
   wherein said library controller additionally is configured to maintain an externally available inventory of data storage cartridges of said library, and excludes said reserved at least one data storage cartridge from said externally available inventory.

2. The automated data storage library of claim 1, wherein said library controller additionally is configured to indicate externally that said operated data storage drive is not being used.

3. The automated data storage library of claim 1, wherein said library controller is configured to, at predetermined intervals, operate said at least one data storage drive and said at least one memory to transfer at least a portion of said information stored in said at least one memory to said reserved at least one data storage cartridge.

4. The automated data storage library of claim 1, wherein said library controller is configured to respond to at least one predetermined event, to operate said at least one data storage drive and said at least one memory to transfer at least a portion of said information stored in said at least one memory to said reserved at least one data storage cartridge.

5. The automated data storage library of claim 1, wherein said library controller additionally is configured to, at start up, operate said at least one data storage drive and said at least one memory to transfer at least a portion of information stored in said reserved at least one data storage cartridge to said at least one memory to initialize said memory for storing information regarding operation of said automated data storage library.

6. The automated data storage library of claim 1, wherein said memory comprises a non-volatile memory, such that said memory may retain said information regarding operation of said automated data storage library, for a subsequent start up of said library.

7. A data storage system comprising:
   at least one host system; and
   an automated data storage library comprising:
   a plurality of storage shelves configured to store data storage cartridges;
   at least one robot accessor configured to transport said data storage cartridges;
   at least one data storage drive configured to read and write data with respect to data storage cartridges;
   at least one interface configured to allow communication between said automated data storage library and said at least one host system;
   at least one memory; and
   at least one library controller configured to operate said at least one robot accessor to transport said data storage cartridges; configured to store information regarding operation of said automated data storage library in said at least one memory; configured to reserve at least one data storage cartridge, and to operate said at least one data storage drive and said at least one memory to transfer at least a portion of said information stored in said at least one memory to said reserved at least one data storage cartridge; and configured to maintain an inventory of data storage cartidges of said library, said inventory available to said at least one host system via said interface, and to exclude said reserved at least one data storage cartridge from said inventory.

8. The data storage system of claim 7, wherein said library controller additionally is configured to indicate to said at least one host system that said operated data storage drive is not being used.

* * * * *